United States Patent [19]
Holmes et al.

[11] Patent Number: 6,141,371
[45] Date of Patent: Oct. 31, 2000

[54] JAMMING SUPPRESSION OF SPREAD SPECTRUM ANTENNA/RECEIVER SYSTEMS

[75] Inventors: Jerry D. Holmes; Kenneth S. Barron; Anthony Reid, all of Plano, Tex.

[73] Assignee: Raytheon Company, Lexington, Mass.

[21] Appl. No.: 08/985,345

[22] Filed: Dec. 4, 1997

Related U.S. Application Data

[60] Provisional application No. 60/034,297, Dec. 18, 1996.

[51] Int. Cl.$^7$ .................................................. H04B 15/00
[52] U.S. Cl. .............................. 375/130; 342/17; 342/18; 342/19; 342/379
[58] Field of Search ..................................... 375/200, 207, 375/346, 347, 349, 350, 351; 455/1; 342/17, 18, 19, 379

[56] References Cited

U.S. PATENT DOCUMENTS

| | | |
|---|---|---|
| 4,170,775 | 10/1979 | Masak et al. . |
| 4,359,736 | 11/1982 | Lewis ..................................... 343/17.2 |
| 4,673,943 | 6/1987 | Hannan . |
| 4,893,128 | 1/1990 | Parl et al. ............................... 342/379 |
| 4,901,082 | 2/1990 | Schreiber et al. ........................ 342/89 |
| 5,281,930 | 1/1994 | Taromaru et al. . |
| 5,299,148 | 3/1994 | Gardner et al. . |
| 5,359,329 | 10/1994 | Lewis et al. . |
| 5,485,485 | 1/1996 | Briskman et al. . |
| 5,640,385 | 6/1997 | Long et al. . |
| 5,712,641 | 1/1998 | Casabona et al. ....................... 342/362 |
| 5,990,831 | 11/1999 | McDowell .............................. 342/378 |

OTHER PUBLICATIONS

Frost, "An Algorithm for Linearly Constrained Adaptive Array Processing", IEEE Proc. 60:926–935 (1972), pp. 238–247.

Griffiths, et al. "An Alternative Approach to Linearly Constrained Adaptive Beamforming", IEEE Transactions on Antennas and Propagation, vol. AP–30. No. 1, Jan. 1982, pp. 27–34.

*Primary Examiner*—Stephen Chin
*Assistant Examiner*—Mohammad Ghayour
*Attorney, Agent, or Firm*—Baker Botts L.L.P.

[57] ABSTRACT

A jamming suppression system which includes a plurality of receivers for receiving electromagnetic radiations and a separate notch filter coupled to each receiver for filtering selected frequencies from electromagnetic radiations received by each of the receivers. In accordance with one embodiment of the invention, a spatial combiner responsive to the outputs of each of the notch filters extracts essentially jam-free information from the electromagnetic radiations. In accordance with a second embodiment of the invention, a plurality of spatial combiners, each responsive to the outputs of each of the notch filters, extracts essentially jam-free information from the electromagnetic radiations. The notch filters are adaptive notch filters for on-line selection of their filtering action. One of the notch filters is a master filter and the remainder of the notch filters are slave filters controlled by the master filter. In both embodiments, spatial filtering action is accomplished using a generalized sidelobe canceler that permits gain (relative to an isotropic antenna) to be preserved in the direction of one or more satellites while casting spatial mulls in the directions of inadvertent friendly or hostile jamming signals.

29 Claims, 3 Drawing Sheets

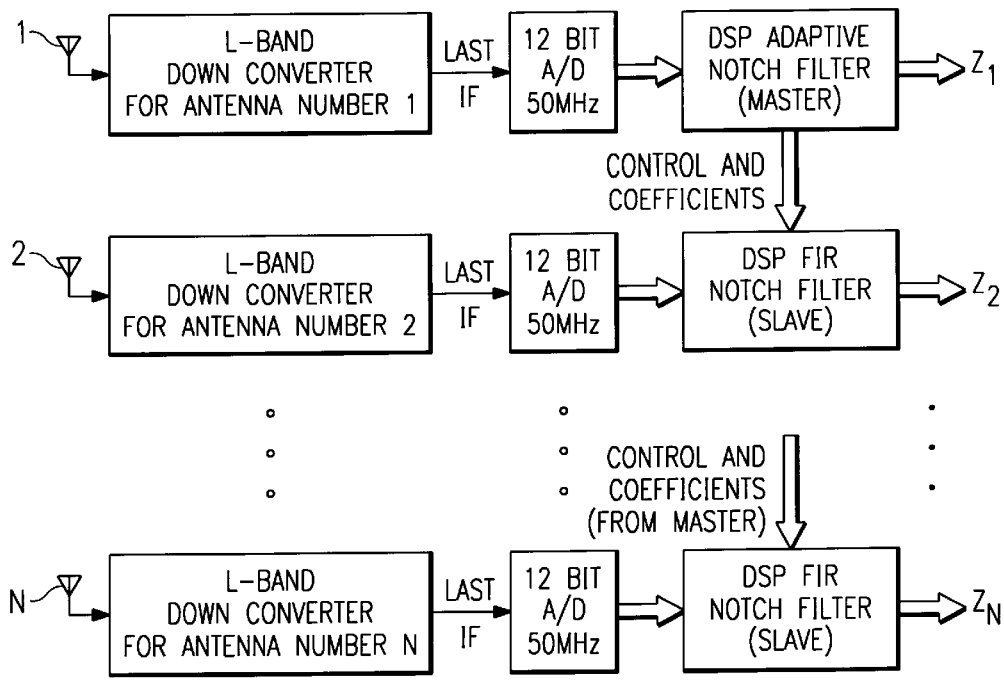
FIG. 2a
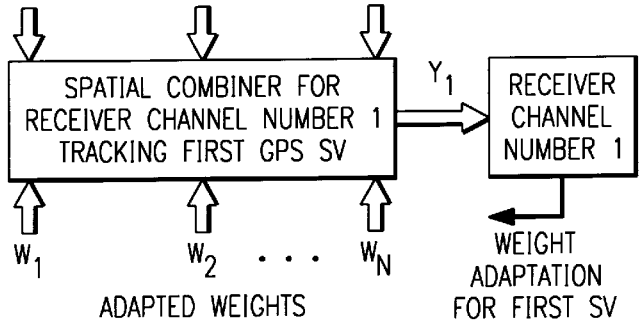
FIG. 2b
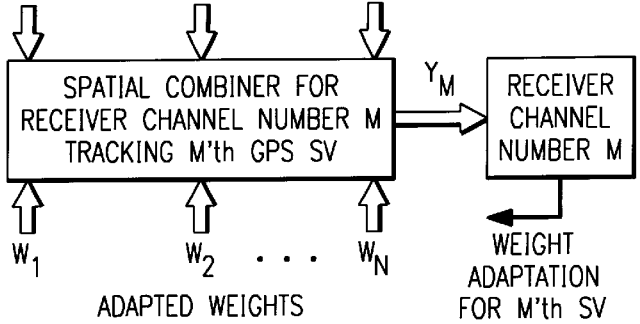

JAMMING SUPPRESSION OF SPREAD SPECTRUM ANTENNA/RECEIVER SYSTEMS

CROSS REFERENCE TO RELATED APPLICATIONS

This application claims priority under 35 USC §119 of provisional application No. 60/034,297 filed Dec. 18, 1996.

BACKGROUND OF THE INVENTION

1. Field of the Invention

This invention relates to improved jamming suppression techniques and, more specifically, to a technique for improved jamming suppression of spread spectrum antenna/receiver systems, such as the Global Positioning System (GPS).

2. Brief Description of the Prior Art

Spread spectrum communication is well known and is a means of communicating by purposely spreading the spectrum (frequency extent or bandwidth) of the communication signal well beyond the bandwidth of the unspread signal. Spread spectrum signals are typically transmitted by electromagnetic waves in free space with usage in both non-military and military systems.

Spread spectrum communication and/or navigation receivers have some natural jamming immunity that is inherent to the way that matched filter receivers operate. However, there is a limit to this natural jamming rejection capability. When a jammer (either inadvertently friendly or hostile) produces an amount of jamming power at the antenna of the spread spectrum receiver that exceeds the limit of the receiver, the receiver is then unable to recover the desired information. For example, in the case of a GPS receiver, a 0 dBi antenna receives a signal from the GPS satellites at a level of approximately −133 dBm. There is some spread spectrum processing gain against jamming signals, however, initial acquisition becomes difficult when the jamming signal is approximately 30 dB stronger than the GPS signal, such jamming signal then being only −133 dBm+30 dBm=−103 dBm. It is therefore not particularly difficult for a hostile or inadvertent friendly jammer to exceed this amount of jamming power in the GPS receiver/antenna system. When this jamming situation occurs, a standard GPS receiver cannot acquire the GPS signals. Since the receiver cannot track GPS signals, the result is an inability to develop a navigation solution based upon GPS. Though the discussion herein will generally be provided using GPS as a principal example, it should be understood that the techniques described are applicable to any spread spectrum communications or navigation system which is required to acquire and track radio signals arriving simultaneously from multiple angles and that is being jammed by electromagnetic radiations.

Spread spectrum communication/navigation system receivers, such as GPS, typically operate under conditions where the signal power is substantially lower than the total receiver front end thermal noise power in the spread spectrum bandwidth of the signal. In the specific case of GPS, the GPS signal can easily be 30 dB to 40 dB below the receiver front end noise power level in the 10.23 Mhz chip rate bandwidth. The matched filter processing improves the signal to noise ratio (SNR) by the time-bandwidth product which is 53 dB for GPS P(Y) code and 43 dB for C/A code. The result of this matched filter processing is to increase the net SNR well above 0 dB so that accurate parameter estimates can be made. The fact that the spread spectrum signal power is well below the receiver front end noise power level at the point in the signal processing flow where both the temporal narrowband jammer rejection and spatial adaptation wideband jammer rejection are accomplished is very significant. In many adaptive cancellation applications where the desired signal is at or above the receiver front end noise level, the adaptive algorithm has a tendency to cancel the desired signal. In GPS, for example, the desired signal is so far below the front end noise level of the receiver that the jammer cancellation algorithms cannot sense the desired signal sufficiently well to cancel it through adaptation. Consequently, the jammer suppression algorithms may freely adapt to the frequencies of the jammers with only one exception. This exception is when there are more narrowband jammers than the degrees of freedom provided in the temporal nulling assets can effectively null, in which case some of the narrowband jamming signals will reach the spatial adaptation process where they will be nulled if there are sufficient remaining degrees of freedom, considering the number of broadband jammers present. The spatial adaptation algorithm should spend one of its degrees of freedom protecting the single angle of its designated GPS satellite signal.

In general, signal jammers are of two types, one type having a very narrow bandwidth, such as, for example, a sine wave. Such jammers are suppressed by operating in the time domain with notch filters which filter out the jamming frequency or frequencies from the filter output while passing the remainder of the received signal. In this way, only a small part of the GPS signal is removed with a sufficient amount of the GPS signal remaining to permit appropriate operation therewith. The other type of jammer is broadband and generally has a bandwidth substantially the same as the GPS signal. In this case, a notch filter which filters out the jamming frequencies will also filter out most of or all of the GPS signal, with an insufficient portion of the GPS signal remaining to permit appropriate operation therewith. Accordingly, jamming suppression of jamming signals having substantially the same bandwidth as the GPS signal is instead provided by a procedure known as spatial filtering. With spatial filtering, the direction from which the signal is received is taken into account with the filtering action being based upon such direction rather than frequency. Therefore, as long as the jamming signal is not travelling to the receiver in the same direction as the GPS signal, the jamming signal can be filtered out by such well known spatial filtering techniques.

While the above described prior art jamming suppression techniques have been successfully employed, there is always a need for even better jamming suppression techniques to combat improvements in jamming techniques.

SUMMARY OF THE INVENTION

In accordance with the present invention, there is provided an improved jamming suppression technique and system for spread spectrum antenna/receiver systems.

Briefly, according to one feature of the invention, the temporal filters precede the spatial combiner, resulting in the suppression of narrowband jamming signals to a degree that would be much more difficult using spatial techniques. Having the temporal filters precede the spatial combiner results in the suppression of narrowband jamming signals before the spatial adaptation algorithm is invoked. This allows the spatial adaptation algorithm to apply all degrees of freedom to the remaining jammers, all of which are broadband. As an example of what could otherwise happen, assume the strongest jamming signals into the antenna are narrowband. If the spatial adaptation were attempted first, then it would cast spatial nulls in the direction of the strong narrowband jammers. Every null so cast is one less null that is available for broadband jammer suppression. (The temporal finite impulse response (FIR) filter is unable to suppress the broadband jamming signals without also suppressing the GPS signal by the same amount or more.)

Having one spatial combiner per GPS satellite signal to be acquired/tracked rather than a single spatial combiner for all GPS satellite signals to be acquired/tracked, is also highly desirable. In some spatial adaptation schemes, one may use spatial degrees of freedom in the following way: one degree of freedom is required per angle where a null is cast, and one degree of freedom is required per angle required to be protected from nulling (in this case, the GPS satellite signal angle of arrival). If only a single spatial combiner is used, and if six GPS satellites are being acquired/tracked, then the first six degrees of freedom could be required just to retain gain toward the GPS satellites. If several spatial nulls are required, then a very large number of antenna/receiver channels are required. In contrast, where there is one spatial combiner per GPS satellite signal to be acquired/tracked, by definition, only one spatial degree of freedom is required to protect the angle of its GPS satellite signal. None of the remaining GPS satellite angles need to be protected for this combiner since every GPS satellite being acquired/tracked has its own unique spatial combiner. The combination of having the temporal filters precede the spatial combiner and having a spatial combiner associated with each satellite provides even greater jamming suppression capability since the combined improvements discussed above are obtained.

This overall architecture is very efficient in its use of assets. The narrowband jamming signals are attenuated in adaptive FIR filters where this is accomplished with maximum efficiency. Digital signal processing (DSP) chips are well known which are capable of handling this task by attenuating narrowband jamming signals by 60 to 80 dB while leaving a GPS signal relatively undistorted so that the matched filter receiver can still acquire and track the resultant signal. To obtain spatial degrees of freedom, the spatial combiners generally require one antenna/receiver channel per degree of freedom, which is relatively expensive in terms of RF hardware, antenna elements and antenna area on the host platform. Consequently, it is important that these precious resources be used to meet only essential requirements, such as wideband jammer suppression, while retaining gain on at least one GPS satellite. This is exactly what the architecture of the present invention accomplishes.

The antijam architecture generally includes a plurality of channels. In the case of GPS, each channel receives signals from all visible satellites of the GPS system. Each channel has its own antenna and its own receiver, a digitizer in the form of an analog/digital (A/D) converter and an adaptive notch filter, one of the channels having a master notch filter and the other channels having slave notch filters controlled by the master notch filter. In accordance with one embodiment of the invention, all of the notch filters are coupled to a single spatial combiner for all of the receiving channels through which all of the GPS satellites must be tracked. In accordance with a second embodiment of the invention, all of the notch filters are coupled to a plurality of spatial combiners, one for each GPS satellite signal processor.

BRIEF DESCRIPTION OF THE DRAWINGS

FIGS. 2a and 2b together are a block diagram of an anti-jam architecture in accordance with a second embodiment of the present invention.

DESCRIPTION OF THE PREFERRED EMBODIMENTS

Figure 1A:
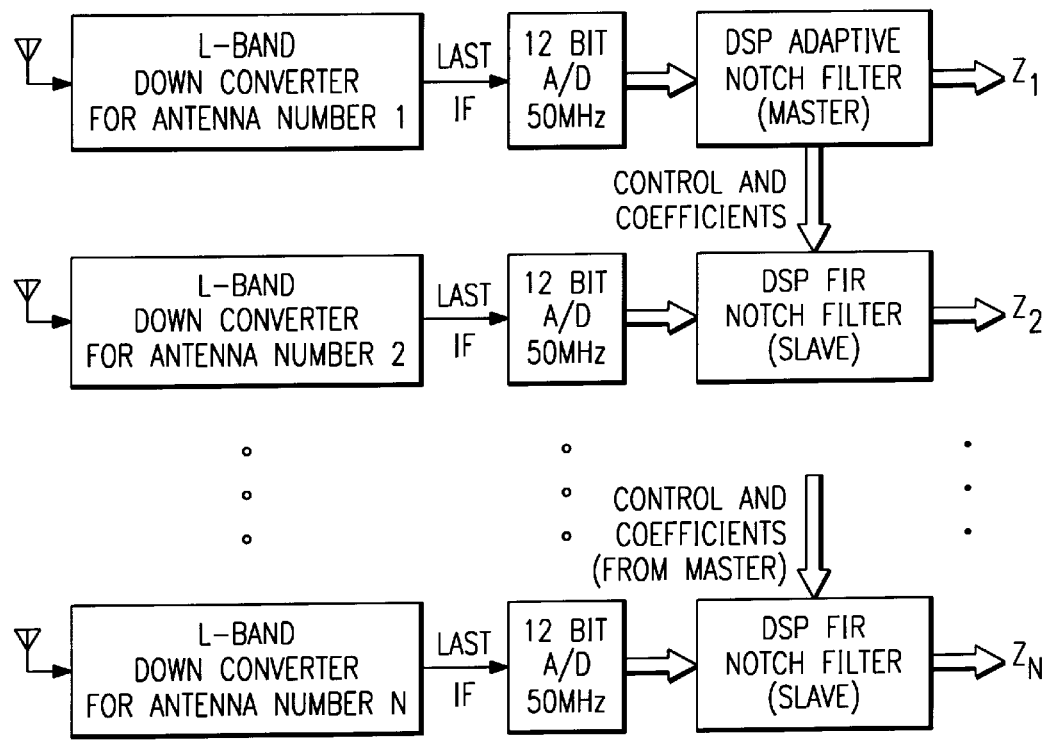
FIGS. 1a and 1b together are a block diagram of an anti-jam architecture in accordance with a first embodiment of the present invention.

Referring first to FIG. 1a, there is shown a plurality of receiving channels (1 . . . N), each channel designed to receive a signal from the GPS satellites. Each channel includes a standard L-band downconverter which translates the L-band GPS signal to a lower intermediate frequency (IF) using well known superheterodyne techniques, as described, for example in The ARRL Handbook for the Radio Amateur, American Relay League, Newington, Conn., 1991, the contents of which are incorporated herein by reference. The L-band downconverter includes an RF amplifier and two mixers, for example, and provides an IF output to a twelve bit, 50 MHz analog to digital (A/D) converter, for example.

The digitized signal is sent from the A/D converter to a standard DSP adaptive notch filter, the operation of which is described in Li, 1., and Milstein, L. B., "Rejection of Narrow-Band Interference in PN Spread-Spectrum Systems Using Transversal Filters", IEEE Transactions on Communications, Vol. COM-30, No. 5, May, 1982, pp. 925–928, the contents of which are incorporated herein by reference. One of the notch filters is a master and the other notch filters are slaves and are controlled by the master notch filter. The function of the notch filter is to recognizes and filter out the narrowband noise or jamming signals, using, for example, an iterative technique known as the Least Mean Squares (LMS) algorithm as described in the above noted Li and Milstein reference. Since each receiving channel is subjected to the same set of jamming signals, the filter coefficients computed by the master notch filter can be used in each slave filter to effectively remove the jamming signals in the other receiving channels. Furthermore, by utilizing the same filter coefficients in all receiving channels, the master and slave filters all have the same impulse response, thereby eliminating any channel-to-channel variation to the GPS signals which would arise if each filter were allowed to adapt its coefficients independently. The slave filters are conventional finite impulse response (FIR) filters whose coefficients are obtained from the master notch filter by electronic means such as, for example, a parallel to serial computer data bus. Implicit in this data transfer mechanism is the existence of certain control signals whose purpose, broadly speaking, is to facilitate the movement of the master coefficients to each slave filter. In summary, each of the channels 1 . . . N will thereby provide a digitized and filtered output $Z_1 \ldots Z_N$ which includes essentially the originally transmitted signal and any broadband receiver front-end noise or broadband jamming noise, but no narrowband noise.

Figure 1B:
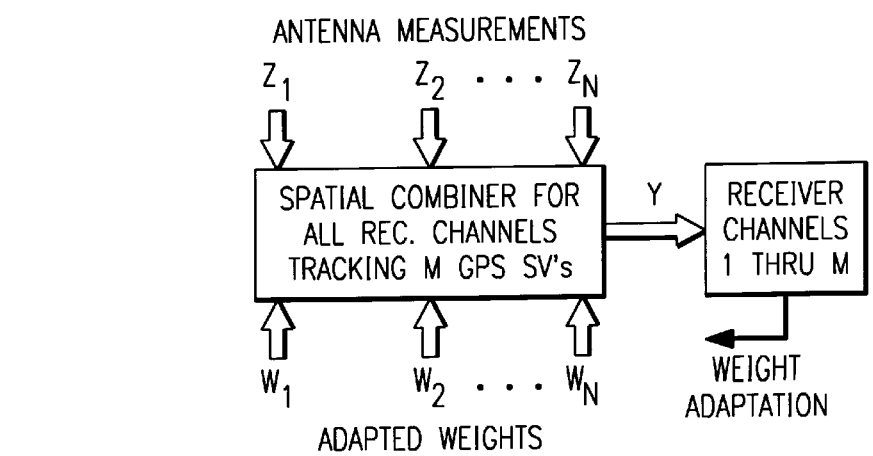

The digitized and filtered outputs $Z_1 \ldots Z_N$ of FIG. 1a are fed to like referenced inputs of the spatial combiner in FIG. 1b where these signals are operated upon in conjunction with the weights $W_1 \ldots W_N$ to provide a spatially filtered output, Y. The output of the spatial filter combiner structure shown in FIG. 1b is the weighted and summed composite of the signals $Z_1 \ldots Z_N$. The single output Y is fed to each of the GPS satellite signal processors where up to M satellites may be tracked simultaneously. Although containing certain unique elements, this structure is consistent with that of the classical phased array antenna described in W. L. Stutzman and G. A. Thiele, Antenna Theory and Design, John Wiley & Sons, New York, N.Y., 1981, pp. 108–168, the contents of which are incorporated herein by reference.

The weights $W_1 \ldots W_N$ shown in FIG. 1b are determined using a standard beamforming technique such as the one described in M. I. Skolnik, Introduction to Radar Systems, McGraw-Hill, New York, N.Y., 1980, pp. 278–342, the contents of which are incorporated herein by reference. The inputs to the beamforming algorithm are the azimuth and elevation angles (with respect to some reference plane) to the desired GPS satellite. The azimuth and elevation angles are calculated using the orientation of the reference plane and the coordinates of the GPS satellite. The orientation of the reference plane is calculated from knowledge of the host platform's attitude which is obtained from an inertial measurement unit (IMU) and the position of the GPS satellite is learned in the process of demodulating the GPS navigation message. The spatial filtering operation is accomplished using an algorithm based upon what is widely known as the generalized sidelobe canceler algorithm, the background theory and operation of which is described in Frost, III, O. L., "An Algorithm for Linearly Constrained Adaptive Array Processing", Proceedings of the IEEE, Vol. 60, 1972, pp. 926–935 and in Griffiths, L. J. and Jim, C. W., "An Alternative Approach to Linearly Constrained Adaptive Beamforming", IEEE Transactions on Antenna and Propagation, Vol. AP-30, No. 1, January 1982, pp. 27–34, the contents of both of which are incorporated herein by reference.

Figure 3:
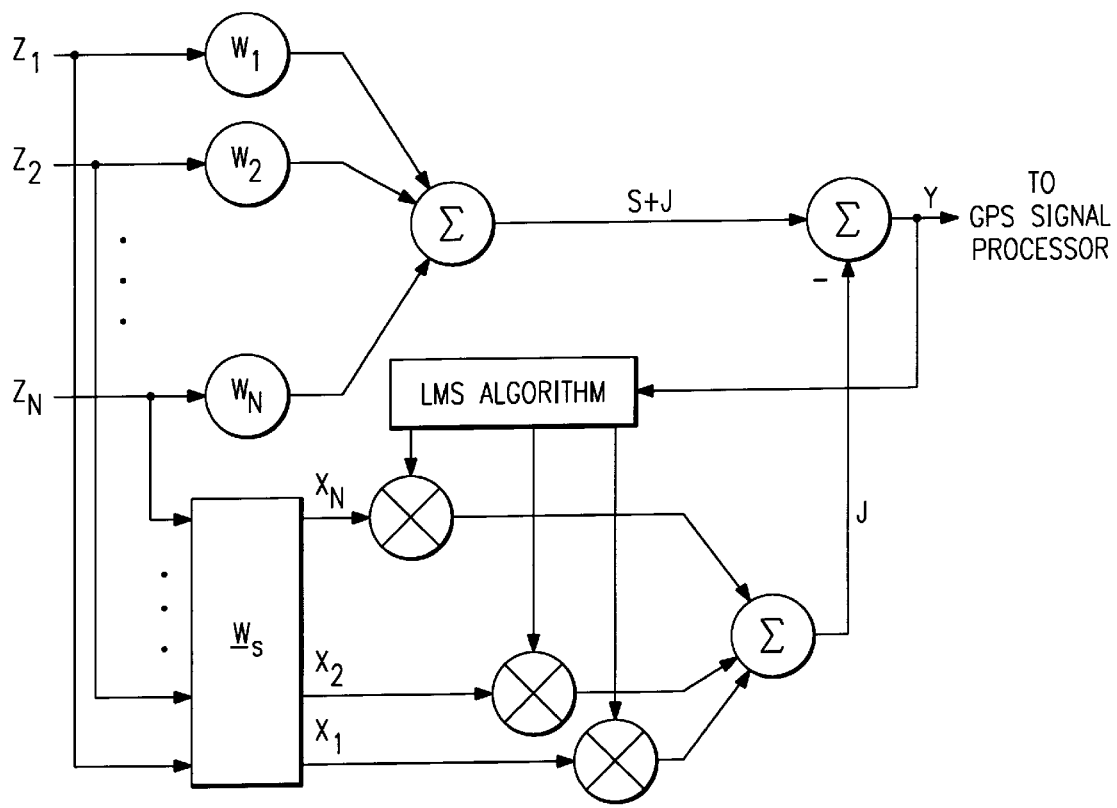
FIG. 3 is a block diagram of the generalized sidelobe canceler algorithm used in both embodiments of the present invention.

The topology of the generalized sidelobe canceler algorithm used in this preferred embodiment is shown in FIG. 3. The digital signals $Z_1 \ldots Z_N$ are multiplied by the weights $W_1 \ldots W_N$ and then summed together. From this output, denoted S+J in FIG. 3, an estimate J of the jamming signals is subtracted to obtain a signal Y (c.f. FIG. 1b), which is free of both narrowband and wideband jamming signals. The estimate of jamming signals is formed by first arranging the digital signals $Z_1 \ldots Z_N$ into a vector and carrying out a matrix multiplication with a blocking matrix $N_S$. The output of the matrix multiplication $X_1 \ldots X_N$ is then weighted and summed together to form the estimate J. The function of the blocking matrix is to effectively place a broad spatial null in the direction of the desired GPS satellite so that only the jamming signals are present at the vector output $X_1 \ldots X_N$. The weights that are applied to the intermediate signals $X_1 \ldots X_N$ are obtained using the LMS algorithm described in the above mentioned Griffiths and Jim reference which requires the difference signal output Y as illustrated in FIG. 3. The elements of the blocking matrix $N_S$ are calculated according to a unique procedure described in Reid, A. and Harding, D., "An Adaptive Sidelobe Canceler for Monopulse Configurations Using Dyadic Wavelet Classes for Constraints", Sep. 15, 1995 (appendix hereto). By forming the difference signal in the manner shown in the lower portion of FIG. 3, an amount of gain relative to an isotropic antenna can be preserved in the direction of a desired GPS satellite while spatial nulls are cast in the direction of inadvertent friendly or hostile jamming signals.

Referring now to FIG. 2a, there is shown a plurality of receiving channels (1 . . . N), each channel designed to receive a signal from all visible GPS satellites (also known as Satellite Vehicles or SV's) as in FIG. 1a. Each channel includes a standard L-band downconverter which includes an RF amplifier and mixer and provides an IF output as in FIG. 1a to a twelve bit, 50 MHz A/D converter, for example, as in FIG. 1a. The digitized signal is sent from the A/D converter to a standard DSP adaptive notch filter as in FIG. 1a, one of the notch filters being a master and the other notch filters being slaves and being controlled by the master notch filter. The notch filters recognizes and filter out the narrowband noise or jamming signals. Each of the channels 1 . . . N will thereby provide a digitized and filtered output $Z_1 \ldots Z_N$ which includes essentially the originally transmitted signal and any broadband noise, but no narrowband noise.

The digitized and filtered outputs $Z_1 \ldots Z_N$ of FIG. 2a, are all fed to like referenced inputs of each of a plurality of spatial combiners, one for each GPS signal processor as shown in FIG. 2b. These signals are operated upon in conjunction with the weights $W_1 \ldots W_N$ to provide a filtered output $Y_1 \ldots Y_M$, one for each of the GPS signal processors. In this preferred embodiment, each set of weights $W_1 \ldots W_N$ is computed as described previously for the first embodiment, except now the azimuth and elevation angles to each of the satellites being tracked is used. That is, the azimuth and elevation angles for SV1 are used to compute the weights $W_1 \ldots W_N$ for channel 1, the azimuth and elevation angles for SV2 are used to compute the weights for channel 2, the azimuth and elevation angles for SVM are used to compute the weights for channel M, etc. The outputs $Y_1 \ldots Y_M$ are derived exactly as described for the first embodiment, except now there is one output for each GPS signal processor. Each spatial combiner implements the same generalized sidelobe canceler algorithm described in the first embodiment, except that in this case each algorithm functions independently of the others. In this embodiment, an amount of gain relative to an isotropic antenna can be preserved in the direction of all GPS satellites being tracked while spatial nulls are cast in the direction of inadvertent friendly or hostile jamming signals.

Concisely stated, the second embodiment has the ability to cancel N–2 inadvertent friendly or hostile jamming signals while protecting all GPS signals being tracked. This is an improvement over standard approaches which are able to cancel N–1 jamming signals but provide no protection of any GPS signal being tracked. That is, in standard approaches, any GPS satellite that happens to be in the line-of-sight of an inadvertent friendly or hostile jammer will be canceled as well as the jamming signal. The second preferred embodiment avoids this difficulty.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A jamming suppression system which comprises:
   (a) a plurality of receivers for receiving electromagnetic radiations;
   (b) a plurality of notch filters which are each coupled to a respective one of said receivers, each said notch filter filtering selected frequencies from electromagnetic radiations received by said receiver coupled thereto so as to suppress narrowband interference; and
   (c) a spatial combiner responsive to the outputs of each of said notch filters for suppressing wideband interference so that said system extracts essentially jam-free information from said electromagnetic radiations.

2. The system of claim 1 wherein said notch filters are adaptive notch filters for on-line selection of their filtering action.

3. A jamming suppression system which comprises:
- a plurality of receivers for receiving electromagnetic radiations;
- a plurality of notch filters which are each coupled to a respective one of said receivers, each said notch filter filtering selected frequencies from electromagnetic radiations received by said receiver coupled thereto; and
- a spatial combiner responsive to the outputs of each of said notch filters for extracting essentially jam-free information from said electromagnetic radiations;
- wherein one of said notch filters is a master filter and the remainder of said notch filters are slave filters controlled by said master filter.

4. A jamming suppression system which comprises:
- a plurality of receivers for receiving electromagnetic radiations;
- a plurality of notch filters which are each coupled to a respective one of said receivers, each said notch filter filtering selected frequencies from electromagnetic radiations received by said receiver coupled thereto; and
- a spatial combiner responsive to the outputs of each of said notch filters for extracting essentially jam-free information from said electromagnetic radiations;
- wherein said notch filters are adaptive notch filters for on-line selection of their filtering action; and
- wherein one of said notch filters is a master filter and the remainder of said notch filters are slave filters controlled by said master filter.

5. The system of claim 1 wherein said spatial combiner provides spatial filtering action using a generalized sidelobe canceler that permits gain (relative to an isotropic antenna) to be preserved in the direction of one or more satellites while casting spatial nulls in the directions of inadvertent friendly or hostile jamming signals.

6. The system of claim 2 wherein said spatial combiner provides spatial filtering action using a generalized sidelobe canceler that permits gain (relative to an isotropic antenna) to be preserved in the direction of one or more satellites while casting spatial nulls in the directions of inadvertent friendly or hostile jamming signals.

7. The system of claim 3 wherein said spatial combiner provides spatial filtering action using a generalized sidelobe canceler that permits gain (relative to an isotropic antenna) to be preserved in the direction of one or more satellites while casting spatial nulls in the directions of inadvertent friendly or hostile jamming signals.

8. The system of claim 4 wherein said spatial combiner provides spatial filtering action using a generalized sidelobe canceler that permits gain (relative to an isotropic antenna) to be preserved in the direction of one or more satellites while casting spatial nulls in the directions of inadvertent friendly or hostile jamming signals.

9. A jamming suppression system which comprises:
(a) a plurality of receivers for receiving electromagnetic radiations;
(b) a plurality of notch filters which are each coupled to a respective one of said receivers, each said notch filter filtering selected frequencies from electromagnetic radiations received by said receiver coupled thereto so as to suppress narrowband interference; and
(c) a plurality of spatial combiners, each said spatial combiner being responsive to the outputs of each of said notch filters for suppressing wideband interference so that said system extracts essentially jam-free information from said electromagnetic radiations.

10. The system of claim 9 wherein said notch filters are adaptive notch filters for on-line selection of their filtering action.

11. The system of claim 9 wherein one of said notch filters is a master filter and the remainder of said notch filters are slave filters controlled by said master filter.

12. The system of claim 10 wherein one of said notch filters is a master filter and the remainder of said notch filters are slave filters controlled by said master filter.

13. The system of claim 9 wherein each said spatial combiner provides spatial filtering action using a generalized sidelobe canceler that permits gain (relative to an isotropic antenna) to be preserved in the direction of one or more satellites while casting spatial nulls in the directions of inadvertent friendly or hostile jamming signals.

14. The system of claim 10 wherein each said spatial combiner provides spatial filtering action using a generalized sidelobe canceler that permits gain (relative to an isotropic antenna) to be preserved in the direction of one or more satellites while casting spatial nulls in the directions of inadvertent friendly or hostile jamming signals.

15. The system of claim 11 wherein each said spatial combiner provides spatial filtering action using a generalized sidelobe canceler that permits gain (relative to an isotropic antenna) to be preserved in the direction of one or more satellites while casting spatial nulls in the directions of inadvertent friendly or hostile jamming signals.

16. The system of claim 12 wherein each said spatial combiner provides spatial filtering action using a generalized sidelobe canceler that permits gain (relative to an isotropic antenna) to be preserved in the direction of one or more satellites while casting spatial nulls in the directions of inadvertent friendly or hostile jamming signals.

17. The system of claim 1, wherein said notch filters are adaptive notch filters which each effect filtering using an iterative least mean squares technique.

18. The system of claim 1, wherein said receivers are operable to receive said electromagnetic radiation in a bandwidth corresponding to electromagnetic radiation from global position system (GPS) satellites.

19. A method of jamming suppression, comprising the steps of:
- receiving electromagnetic radiation in each of a plurality of receivers;
- filtering selected frequencies from said electromagnetic radiation received by each of said receivers using a respective notch filter in a manner effecting suppression of narrowband interference;
- spatially combining the outputs of each of said notch filters in a manner effecting suppression of wideband interference, so as to extract essentially jam-free information from said electromagnetic radiation received by said receivers.

20. The method of claim 19, wherein said filtering step is carried out using an adaptive filtering technique which includes an iterative least mean squares technique.

21. An apparatus, comprising:
- a plurality of receivers for receiving electromagnetic radiation;
- a first section operable to temporally suppress narrowband interference present in said electromagnetic radiation received by said receivers; and
- a second section operable to spatially suppress wideband interference present in said electromagnetic radiation received by said receivers.

22. The apparatus of claim 21, wherein said first section includes a plurality of notch filters which each filter selected frequencies from an output of a respective one of said receivers.

23. The apparatus of claim 22, wherein said second section includes a spatial combiner which weights and combines a plurality of signals that are each derived from an output of a respective one of said receivers through a respective one of said notch filters.

24. The apparatus of claim 22, wherein said notch filters are adaptive notch filters which each effect filtering using an iterative least mean squares technique.

25. The apparatus of claim 21, wherein said second section includes a spatial combiner which weights and combines a plurality of signals that are each derived from an output of a respective one of said receivers.

26. The apparatus of claim 21, wherein said receivers are designed to receive electromagnetic radiation from global positioning system (GPS) satellites.

27. A method, comprising the steps of:
receiving electromagnetic radiation in each of a plurality of receivers;
temporally suppressing narrowband interference present in said electromagnetic radiation received by said receivers; and
spatially suppressing wideband interference present in said electromagnetic radiation received by said receivers.

28. The method of claim 27, wherein said step of temporally suppressing is carried out using a plurality of notch filters which each filter selected frequencies from an output of a respective one said receivers.

29. The method of claim 27, wherein said step of spatially suppressing is carried out using a spatial combiner which weights and combines a plurality of signals that are each derived from an output of respective one of said receivers.

* * * * *